June 20, 1961 E. F. HIGGINS 2,989,087
PLASTIC PROTECTOR FOR EXTERNALLY THREADED PIPE ENDS
Filed Dec. 27, 1956 2 Sheets-Sheet 1

INVENTOR
EDWARD F. HIGGINS
BY Jerome J. Gross
ATTORNEY

June 20, 1961 E. F. HIGGINS 2,989,087
PLASTIC PROTECTOR FOR EXTERNALLY THREADED PIPE ENDS
Filed Dec. 27, 1956 2 Sheets-Sheet 2

INVENTOR
EDWARD F. HIGGINS
BY Jerome A. Gross,
ATTORNEY

United States Patent Office 2,989,087
Patented June 20, 1961

2,989,087
PLASTIC PROTECTOR FOR EXTERNALLY THREADED PIPE ENDS
Edward F. Higgins, 23 Orchard Lane, Kirkwood 22, Mo.
Filed Dec. 27, 1956, Ser. No. 630,864
8 Claims. (Cl. 138—96)

This invention relates to thread protectors for externally threaded pipe ends, particularly for relatively hard steel pipes of sizes commonly used in oil and gas fields. The objects of the present invention include providing a truly protective cover, both as a weather seal and a protector which will harmlessly absorb impacts to pipe ends. A further object is to mold an effective, single-use protector out of plastic materials, sometimes with a metal reinforcement. These, and other objects which will be apparent from the specification which follows, are accomplished in the manner hereinafter described and as shown in the accompanying drawings, in which:

Figure 1:
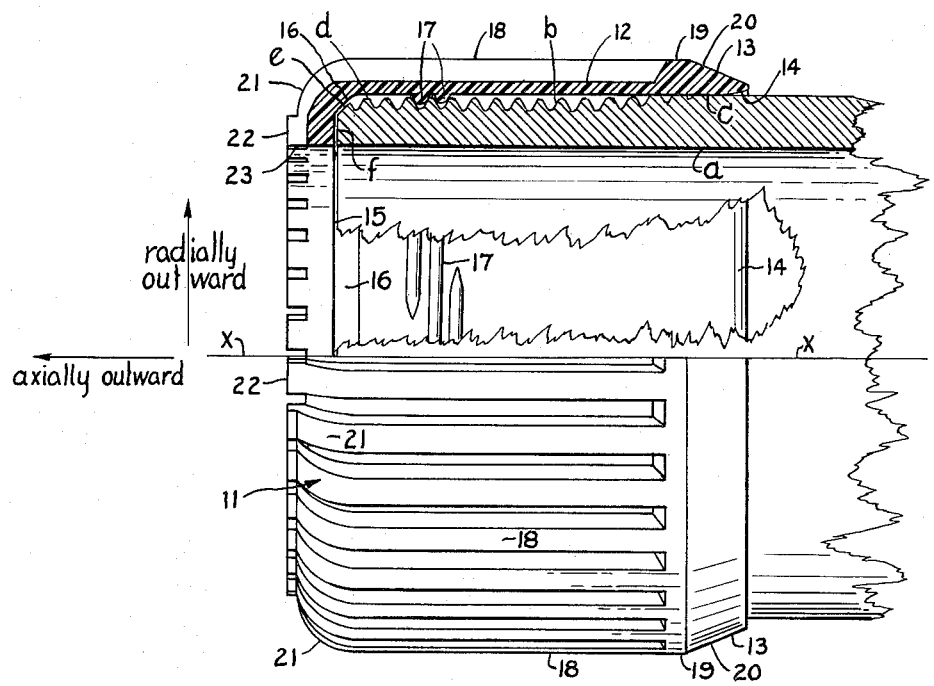
FIGURE 1 is a side view, the lower half in elevation and the upper half in section, of a molded plastic thread protector embodying one form of the present invention, shown in place on the end of an externally threaded pipe which is partly broken away.
Figure 2:
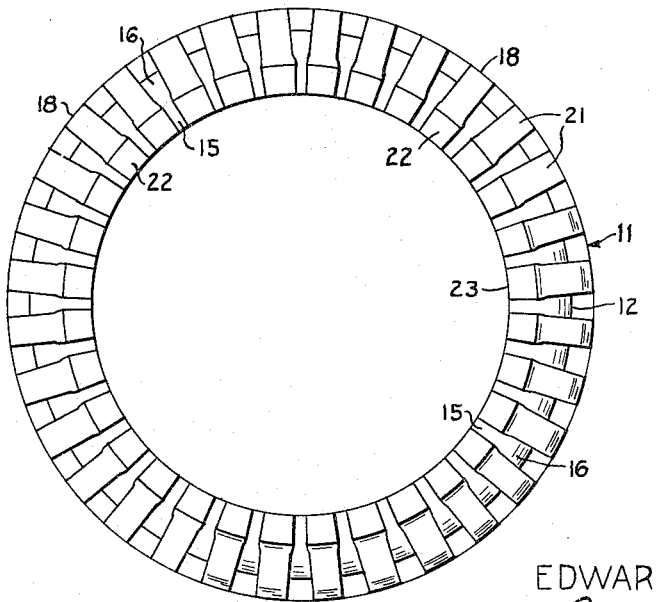
FIGURE 2 is a left end view of the protector of FIGURE 1.

Referring now to FIGURES 1 and 2, there is illustrated an external thread protector generally designated 11, molded of suitable plastic material, preferably one of the elastomeric thermoplastics such as polyethylene whose resiliency, energy-absorption characteristics and sealing-surface characteristics are advantageously utilized. I apply the thread protector 11 to a typical hard steel pipe designated $a$ having external pipe threads $b$ adjacent one end, the threads meeting the outer cylindrical surface of the pipe $a$ at a thread vanishing point $c$. Adjacent the end of the pipe $a$, the threads $b$ end in a tapered end thread portion $d$, axially outward of which (along the pipe axis designated $x$) the pipe $a$ has an end chamfer $e$ which adjoins the pipe end surface $f$. Arrows depicting the "axially outward" and "radially outward" directions, as herein referred to, are shown in FIGURE 1.

The thread protector 11 includes a substantially cylindrical sleeve portion 12 whose inner diameter permits easy fit over the pipe threads $b$; and which terminates at the axially inner end in an elastic cuff 13 which tapers axially and radially inward. The function of the elastic cuff 13 is to grasp the outer cylindrical surface of the pipe $a$ sealingly and elastically, thus to prevent the entrance of dirt, moisture and other foreign matter. The inner diameter of the elastic cuff 13 is therefore molded to be slightly less, at ordinary temperatures, than the outer diameter of the pipe $a$. To facilitate easy installation over the end of the pipe $a$, the elastic cuff 13 has an outwardly belled entrant portion 14.

Within the protector 11 at its axially outward end is a substantially flat, radially inward-extending end flange 15 which covers and seals against the pipe end surface $f$. The end flange 15 terminates radially outward in a chamfer-covering protector portion 16 which is tapered inside for fit against the pipe chamfer $e$, and may be somewhat rounded at its outer side.

Extending axially inward, the inner surface of the sleeve portion 12 is uninterrupted for a distance at least equal to the length of the chamfer $e$ and the tapered outer end thread portion $d$ of the pipe $a$. Axially inward of this point, however, and preferably located just beyond one or two full threads of the pipe $a$, is located an inwardly projecting protector thread 17, which preferably extends slightly more than two turns. The protector thread 17 is formed to the same pitch as the pipe threads $b$ but preferably to a rounded contour so that the protector 11 may be readily stripped from the mold. On driving the protector 11 axially into approximate position on the pipe $a$, the protector thread 17 will press elastically in place between the pipe threads $b$. A slight twist will develop tension in the sleeve portion 12 between the protector thread 17 and the end flange 15, whereby to seal the end flange 15 against the pipe end surface $f$. Thereafter the protector thread 17 serves as a screw retention means, because the protector 11 cannot be removed until it is screwed axially outward beyond the full pipe threads $b$ and well into the tapered outer end threads $d$. However, this involves substantially less turning than is the case with the metal protectors heretofore used.

On the outer surface of the sleeve portion 12 are a plurality of spaced longitudinal ribs 18, each of them preferably substantially deeper than the thickness of sleeve portion 12. These serve a variety of functions. They permit the protector to be driven in place onto the end of the pipe; they also exert a beam-like radially inward pressure on the protector thread 17 to keep it pressed elastically in place between the external pipe threads $b$; and they present an external surface readily grasped whereby to tighten or loosen the protector 11. In addition, the longitudinal ribs 18 absorb sideward impacts in the manner hereinafter more fully described. The spacing of the ribs 18 is preferably less than their width.

At their axially inward ends, the ribs 18 merge with an annular rim 19, of the same radial depth. The rim 19 provides in effect an inter-rib fill which prevents meshing of longitudinal ribs 18 of the protector 11 on one pipe with similar ribs on the protector of an adjacent pipe. The axially inner surface of the rim 19 is sloping and is designated the tapered surface 20. It slopes inward axially and radially, so that other objects, sliding axially outward adjacent the protector, will pass readily over it. The material in the tapered surface 20 also gives added bending resiliency, or "snap," to the elastic cuff 13 into which it tapers.

At the axially outer ends of the longitudinal ribs 18, each has an arcuately formed radially inward-sweeping rib end 21 which protects the chamfer-covering portion 16. Projecting axially outward from the end flange 15 are molded a plurality of deformable nose bumpers 22 which, taken together, form a castellated or serrated axially projecting protector end. The nose bumpers 22 are shown to be in angular registration with the ribs 18; this is advantageous from the standpoint of easy molding.

The generally castellated form of the protector end is of significance in that the spacings between the individual bumpers 22 permit deformation, both elastic and permanent, as hereinafter more fully described. The radially outer edges of the nose bumpers do not extend beyond the radially outer margin of the pipe end surface $f$. The bumpers 22 terminate radially inward in a circular inner margin 23 which has the same inner diameter as that of the pipe $a$.

The protector 11 seals the pipe $a$ between the elastic cuff 13 and the end flange 15. The choice of elastomeric thermoplastic material was dictated, however, by an additional characteristic: shock absorption by reason both of elasticity and plastic deformability.

The longitudinal ribs 18 will absorb great sidewise loads, hence if an up-ended pipe falls so that one end strikes sideward, the ribs 18 which strike will expand sideward into the inter-rib spaces. Should the energy to be absorbed be sufficiently great to exceed the yield point of the material, it will flow sideward in plastic deformation. Elastomeric thermoplastic materials, which may be re-plasticized by heat and then re-molded under pressure, are therefore particularly well suited for the present invention; for a part of the energy accompanying a severe impact may be dissipated in the heat and pressure as the material takes on a new shape.

The castellated form of the axially projecting protector end, (made up of the deformable nose bumpers 22), absorbs axially endwise loads in substantially the same manner; that is, by bulging elastically until the yield point of the material is reached, and thereafter by plastic deformation in which a portion of the impact energy is dissipated as heat which, under the pressure of the load, imparts to the nose bumpers 22 a permanent spread or "set."

Note that the nose bumpers 22 project substantially forward of the arcuate formed ends 21 of the ribs 18, while their inner and outer edges do not extend radially beyond the pipe end face $f$. If any portion extended farther radially inward or outward, so as not to have the backing of the pipe end surface $f$, that portion would not be stressed equally by endwise compressive loads; and would tend to shear off from the adjacent compressed material. The relatively sharp inner and outer traces of the pipe end surface $f$ would aggravate this shearing action. By designing the nose bumpers 22 to extend axially outward beyond the rib ends 21 sufficiently to permit them to deflect without bringing the rib ends 21 into contact with a surface struck by the nose bumpers 22, consistently satisfactory results are achieved. Thus a pipe may be dropped directly endwise, and the impact absorbed by the nose bumpers 22 and spread thence through the end flange material 15 and the chamfer-covering portion 16, without damage to the pipe ends, under much more severe conditions of loading than have heretofore been possible and without shearing or tearing the protector 11.

Figure 3:
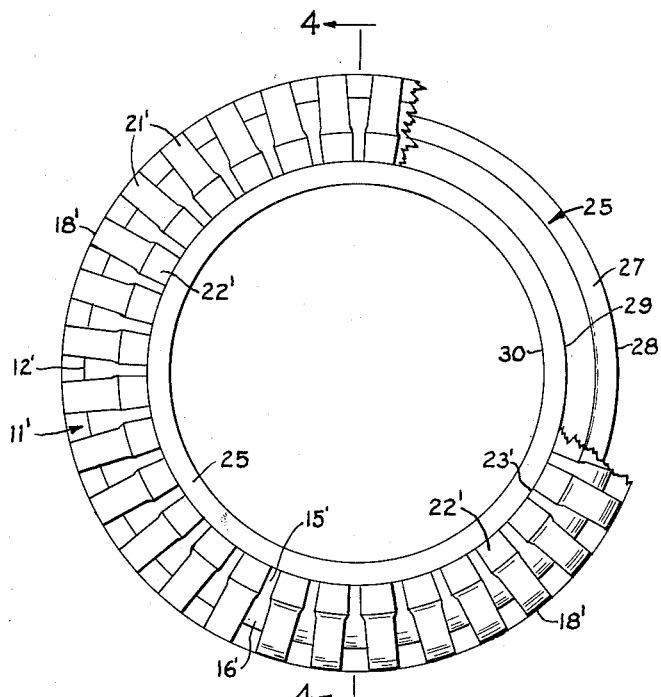
FIGURE 3 is an end view, similar to FIGURE 2, but partly broken away, of a modified embodiment of invention utilizing a metal reinforcing ring insert.
Figure 4:
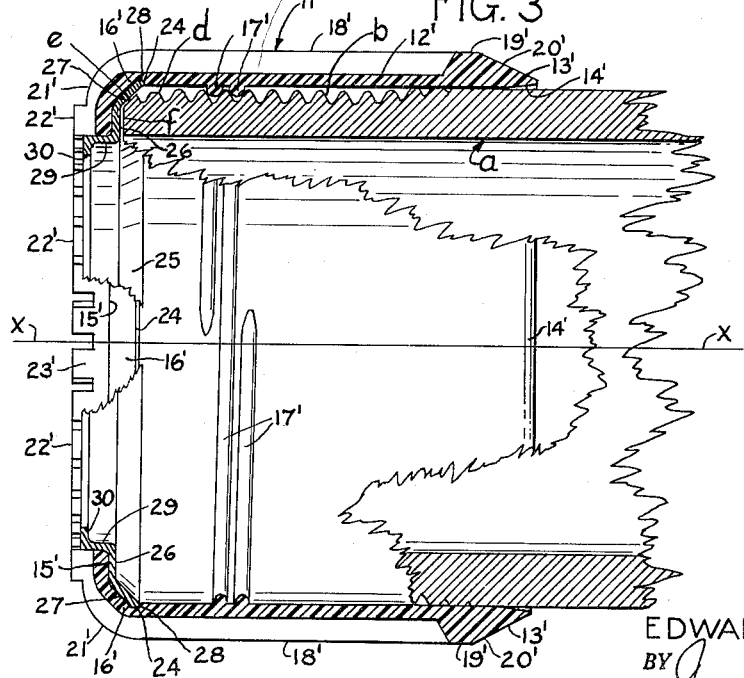
FIGURE 4 is a sectional view taken along line 4—4 of FIGURE 3, shown in place on a pipe end which is partly broken away.

In certain usages, pipes are sometimes subjected to extreme loads diagonally applied to their edges, as, for example, when one end of the pipe is held elevated and the other permitted to strike downward. Such diagonal loads are particularly damaging to externally-threaded pipe ends. If it is desired to protect against extreme diagonal loads, the alternate embodiment shown in FIGURES 3 and 4 may advantageously be utilized. This embodiment is a counterpart of that of FIGURES 1 and 2 in each of the respects heretofore described, and its corresponding portions are numbered 11', 12', etc. In addition, the sleeve portion 12' includes a ring groove 24 formed as an annular undercut on its inner surface adjacent the chamfer-covering portion 16'. The purpose of this groove 24 is to permit the sleeve portion 12' to hold a reinforcing ring generally designated 25 whose outer diameter substantially equals the undistended inner diameter of the sleeve portion 12'.

The reinforcing ring 25 nests within the sleeve 12' adjacent the axially inner surface of the flange 15'. It is formed preferably of a metal no harder than soft steel; and permissibly softer, for example, of aluminum or zinc. The ring 25 serves as a sealing, load-distributing, shock-absorbing and plastic-confining insert as hereinafter described. It is preferably slender, and flanged and beveled as shown.

The ring 25 includes a flat, pipe-end abutting portion 26 which presents its axially inner surface sealingly against the pipe end surface $f$ and distributes over a broad angle any concentrated loads which may be applied endwise. Radially outward adjacent the pipe-end abutting portion 26 is a chamfer-abutting ring portion 27 which in essence is a radially outward-sloping flange formed or bent axially inward at an angle supplementary to the angle of chamfer and conforming on its axially inner side to the pipe chamfer $e$ and on its axially outer side to the chamfer-covering portion 16' of the plastic protector 11'. On the axially outer side of the ring 25, the juncture between the pipe-end abutting portion 26 and the chamfer-abutting ring portion 27 is smoothly curved so as to avoid any tendency to shear through the plastic material of the protector 11'. The radially outermost edge of the chamfer-abutting ring portion 27 is designated the outer ring edge 28; this rests within the ring groove 24 when the protector has been pressed through the inner surface of the sleeve portion 12'.

At the radially inward margin of the flat pipe-end abutting portion 26, the reinforcing ring 25 is flanged axially outward substantially at a right angle to provide a bumper abutment ring 29 radially inward of and supporting the deformable nose bumpers 22', so as to resist radially inward flow of the bumper material under high loads. The distance which the bumper abutment ring 29 extends axially outward is substantially less than the depth of the nose bumpers 22', sufficiently that under high endwise loads the bumpers 22' will compress and still extend axially beyond the bumper abutment ring 29. To reinforce this ring 29, a radially inward-turned reinforcing flange 30 is added.

Assuming a high, concentrated diagonal force applied to the protector 11', there is no tendency for the pipe $a$ to shear through the protector 11', as the sharp edges of the pipe $a$ are covered by the reinforcing ring 25 which transmits the load from the pipe $a$ through the plastic material as a distributed, fairly widely-spread compressive force. If the nose bumpers 22' were permitted to flow radially inward, even such a distributed compressive force would have a shearing tendency. However, the provision herein made against such inflow confines the plastic material so that it receives and reacts the force largely in compression. Since the material is substantially restrained from inflow, its elastomeric thermoplastic properties result in a reaction similar to that of a fluid in compression, thus avoiding failure in shear. The material's resistance to fluid flow is dissipated in heat which itself promotes fluidity and increases the energy absorption characteristic of the protector.

Under extremely high loads the reinforcing ring 25 may deform somewhat, further absorbing energy and saving the end of the pipe $a$ from damage. The low cost of the protector makes it possible to discard it after a single use; hence such permanent deformation is not disadvantageous; and for a small cost the safety of the pipe is insured under extreme conditions.

An important result of the present construction is safety. In oil fields, protectors are handled by workmen with oily gloves. Metal protectors heretofore in use were frequently dropped and caused numerous injuries. The light weight of the present protector, and its freedom from sharp edges, are therefore of great advantage.

Modifications of the present invention will occur to those skilled in the art. This invention is not to be construed narrowly, therefore, but as fully coextensive with the scope of the claims which follow.

I claim:

1. A metal-reinforced plastic protector for pipes externally threaded adjacent their ends, comprising a plastic sleeve having a radially inward-formed end portion and a metal ring within said sleeve, the ring having an axially outer surface presented against the inwardly-formed end portion of the sleeve, said ring further having an axially inner surface conforming to and presented abuttingly against the pipe and surface, the sleeve being formed of elastomeric thermoplastic material of a type permanently deformable under external loads and having external longitudinal bumper projections, further having integral internal-projecting means engaging a portion of the threads of such pipe end whereby to retain said axially inner ring surface sealedly against such pipe end.

2. A shock-absorbing metal reinforced plastic protector for a pipe externally threaded adjacent its end, said end having an end surface chamfered around its outer edge, comprising the construction defined in claim 1, the ring having an outer flange including an axially inner surface formed at such angle to the axially inner surface of the ring as is supplementary to the chamfer angle, the flange having an axially outer surface joining the axially outer surface of the ring in a smoothly curved juncture.

3. A metal-reinforced plastic protector adapted to absorb impact loads applied to threaded pipe ends without shearing, comprising the construction defined in claim 1, its inwardly-formed end portion including an endwise-projecting bumper portion, the ring having an inner edge flange projecting endwise adjacent and radially inward of said bumper portion, the distance of its endwise projection being less than the endwise projection of said bumper portion.

4. An energy-absorbing protector for steel pipe ends, comprising a sleeve and an end-covering portion, characterized in this, that the protector is molded of a material whose hardness is less than that of steel and includes a serrated bumper portion projecting endwise in a region in radial registration with the pipe end surface, together with a reinforcement formed of material harder than the protector material and located in radial registration with the pipe end surface and axially inward of the bumper portion, said reinforcement including a flange projecting axially endwise therefrom radially inward and adjacent the bumper portion, the endwise projection of said reinforcement flange being less than the projection of said bumper portion.

5. A metal-reinforced plastic protector for pipes externally threaded adjacent their ends, comprising a sleeve formed of thermoplastic material of a type permanently deformable under loads, the sleeve having a radially inward-formed end portion including a plurality of radially extending grooves, whereby plastic flow on deformation is directed into said grooves and radial flow is avoided, together with a metal ring within said sleeve at its inward-formed end portion, the ring having an axially outer surface presented against said inward-formed sleeve portion, the ring further having an axial inner surface to be presented abuttingly against the pipe end surface.

6. A protector for externally threaded pipe ends adapted to serve as a weather seal therefor and absorb impacts applied thereto, comprising a sleeve of elastomeric thermoplastic material to grasp sealedly a pipe exterior surface, and having at one end thereof a radially inward flange of substantial extent and presented at such angle to the sleeve as to substantially cover and abut sealedly against a pipe end surface, said sleeve having integral therewith a plurality of substantially rectangular ribs longitudinal thereof and spaced from each other around the outer surface of the sleeve by spaces narrower than the width of the ribs and having extensions integral therewith endwise of said flange, said rib extensions being spaced from each other by spaces narrower than their width, said ribs and rib extensions being of such height and width as to receive and absorb forces applied to the pipe by plastic flow of the ribs and rib extensions into the spaces therebetween.

7. A protector as defined in claim 6, the sleeve having on its inner surface and spaced from its ends an internally projecting rounded screw thread.

8. A protector as defined in claim 6, the rib extensions having bumper portions projecting axially therefrom.

References Cited in the file of this patent

UNITED STATES PATENTS

| | | |
|---|---|---|
| 1,628,090 | Weiss | May 10, 1927 |
| 1,674,998 | Spang | June 26, 1928 |
| 1,708,657 | Brown et al. | Apr. 9, 1929 |
| 2,133,049 | Shimer | Oct. 11, 1938 |
| 2,215,829 | Evans | Sept. 24, 1940 |
| 2,534,137 | Lewis | Dec. 12, 1950 |
| 2,546,394 | Harmon | Mar. 27, 1951 |
| 2,617,553 | Lay | Nov 11, 1952 |
| 2,627,877 | Phillips | Feb. 10, 1953 |
| 2,724,463 | Becker | Nov. 22, 1955 |
| 2,826,222 | Case | Mar. 11, 1958 |
| 2,857,510 | Haggerty et al. | Oct. 21, 1958 |

FOREIGN PATENTS

| | | |
|---|---|---|
| 352,540 | Great Britain | July 13, 1931 |